United States Patent
Haselsteiner et al.

(10) Patent No.: US 7,133,541 B2
(45) Date of Patent: Nov. 7, 2006

(54) METHOD FOR ANALYZING FINGERPRINT IMAGES

(75) Inventors: Ernst Haselsteiner, Graz (AT); Stefan Jung, München (DE); Henning Lorch, München (DE); Brigitte Wirtz, Holzkirchen (DE)

(73) Assignee: Infineon Technologies AG, Munich (DE)

( * ) Notice: Subject to any disclaimer, the term of this patent is extended or adjusted under 35 U.S.C. 154(b) by 734 days.

(21) Appl. No.: 10/231,784

(22) Filed: Aug. 29, 2002

(65) Prior Publication Data

US 2003/0035571 A1 Feb. 20, 2003

Related U.S. Application Data

(63) Continuation of application No. PCT/DE01/00654, filed on Feb. 20, 2001.

(30) Foreign Application Priority Data

Feb. 29, 2000 (DE) ................................ 100 09 539

(51) Int. Cl.
*G06K 9/00* (2006.01)
(52) U.S. Cl. ...................... 382/124; 382/173; 382/237; 382/274
(58) Field of Classification Search ................ 382/124, 382/125, 127, 272, 302, 209, 218, 116, 211, 382/260, 270, 274, 197, 228, 266, 289, 177, 382/237; 356/71
See application file for complete search history.

(56) References Cited

U.S. PATENT DOCUMENTS

| | | | | | |
|---|---|---|---|---|---|
| 4,368,462 | A | * | 1/1983 | Crawley | 345/530 |
| 4,525,859 | A | * | 6/1985 | Bowles et al. | 382/125 |
| 4,827,527 | A | | 5/1989 | Morita et al. | 382/127 |
| 5,027,401 | A | * | 6/1991 | Soltesz | 380/54 |
| 6,195,447 | B1 | * | 2/2001 | Ross | 382/125 |
| 6,263,091 | B1 | * | 7/2001 | Jain et al. | 382/125 |

FOREIGN PATENT DOCUMENTS

| | | |
|---|---|---|
| EP | 0 173 972 B1 | 3/1986 |
| JP | 03 053 385 | 3/1991 |
| WO | WO 01/24700 A1 | 4/2001 |

* cited by examiner

*Primary Examiner*—Sheela Chawan
(74) *Attorney, Agent, or Firm*—Laurence A. Greenberg; Werner H. Stemer; Ralph E. Locher

(57) ABSTRACT

A method for analyzing fingerprint images includes picking up a sequence of images at very short time intervals, while a finger is being placed onto an electronic fingerprint sensor. A criterion for recognizing a live finger is extracted from variations in the images. The images are defined as a pixel raster having different gray values, with the aid of which the pixels are assigned binary values of zero or one. Significant changes in the values are detected and compared, with the aid of distinctive numbers or the like, to known typical changes that occur regularly in a particular image class.

6 Claims, 1 Drawing Sheet

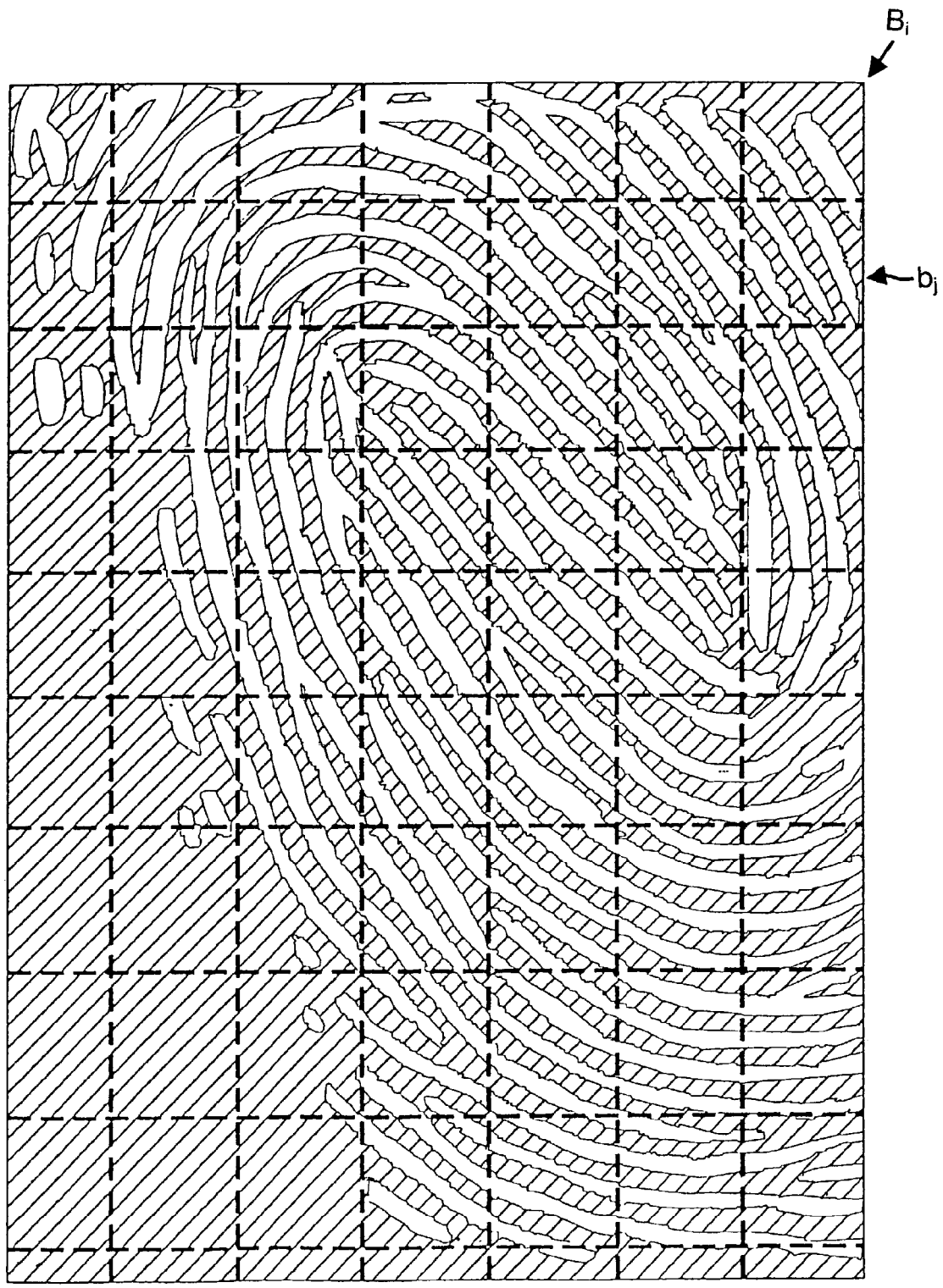

METHOD FOR ANALYZING FINGERPRINT IMAGES

CROSS-REFERENCE TO RELATED APPLICATION

This application is a continuation of International Application No. PCT/DE01/00654, filed Feb. 20, 2001, which designated the United States and was not published in English.

BACKGROUND OF THE INVENTION

Field of the Invention

The present invention relates to a method for analyzing electronically generated fingerprint images with which it is possible to distinguish original images of live fingers from forgeries.

Biometric techniques of personal identification can be implemented in automatic systems. Such systems process the input data containing the biometric features and extract characteristic features that can be assigned to a person in a substantially unambiguous fashion.

However, a reliable identification depends on the ability to guarantee that the measurement device or image-recording device cannot be manipulated. In recognizing fingerprints with the aid of an electronic fingerprint sensor, it is necessary to be able to distinguish a fingerprint image that comes from a live finger from an image that comes from an attempted forgery.

A series of solutions have been implemented, according to which a live finger can be distinguished from a dead finger or from an imitation of a finger, with the aid of biological properties (temperature, blood pressure, electrical skin resistance, contact pressure, detection of moisture caused by perspiration, etc.,).

SUMMARY OF THE INVENTION

It is accordingly an object of the invention to provide a method for analyzing electronically generated fingerprint images that overcomes the hereinafore-mentioned disadvantages of the heretofore-known methods of this general type and with which the recognition of a live finger can be performed without additional outlay.

With the foregoing and other objects in view, there is provided, in accordance with the invention, a method for analyzing electronically generated fingerprint images, which contains the steps of: a) generating fingerprint images subdivided into pixels in chronological succession, while a fingerprint is registered by a fingerprint sensor; b) determining and storing a number of pixels containing a gray value exceeding a prescribed value for each fingerprint; and c) determining and storing differences of the numbers for successively generated fingerprint images.

In accordance with another mode of the invention, there is provided a method, which further includes the steps of: d) determining (for each fingerprint image that is generated in step b) a special number of pixels exceeding the prescribed gray value for the first time in an appertaining fingerprint image and adjacent pixels which already exceed the prescribed gray value in a preceding fingerprint image; and e) relating the differences determined in step c from to one or more of appertaining special numbers in respective ratios.

In accordance with a further mode of the invention, the method further includes the steps of: f) determining, for a last recorded fingerprint image, a number of pixels exceeding the prescribed gray value and located successively along finger lines rendered in the fingerprint image or located along imaginary center lines of the finger lines or along corresponding center lines generated with a computer by thinning the finger lines into curves; and norming the special numbers by dividing with the above number.

In accordance with an added mode of the invention, the method further includes the step of: g) determining the special fingerprint images for which one of two given ratios exceeds a prescribed threshold.

In accordance with an additional mode of the invention, the method further includes the step of: h) converting the special fingerprint images determined in step g into an image having gray value gradations by addition.

In accordance with a concomitant mode of the invention, the method further includes the steps of: i) subdividing the image of step h into blocks; j) calculating, in each block, an average value of the gray values; k) calculating, in each block, a distribution, as a standard deviation of the gray values about the average value; and l) calculating a quotient of the average value of standard deviations across all blocks and the distribution, as a standard deviation, of the average values of the gray values in respective blocks, for distinguishing a live finger from a forged image.

Accordingly, the fingerprint image that is generated by a fingerprint sensor and the time variations of the image are utilized for performing a dynamic analysis of the fingerprint image. While a fingerprint is being registered by a fingerprint sensor, preferably while the finger is being placed on the sensor, a sequence of individual fingerprint images is recorded at very short time intervals, and their differences are detected. From the dynamic variation, a criterion is extracted or a special quantity is calculated with which the variation of an image given placement of a real live finger can be distinguished from the variation of the images given placement of a forgery. The fingerprint images are determined by an electronic fingerprint sensor as the bit map of a raster of pixels with different gray values, which are then binarized.

Other features which are considered as characteristic for the invention are set forth in the appended claims.

Although the invention is illustrated and described herein as embodied in a method for analyzing fingerprint images, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The sole FIGURE is a diagrammatic view of a fingerprint image according to the invention.

DESCRIPTION OF THE PREFERRED EMBODIMENTS

Referring now to the single FIGURE of the drawing, there are seen the black-white contours of a typical fingerprint image, in which the ridges and furrows of the skin surface are clearly recognizable. Depending on the resolving power of the utilized fingerprint sensor, the margins of the fingerprint lines can include different gradations of gray (not shown in the FIGURE). The image is composed of a number of small pixels, preferably with dimensions substantially below the line width. In the FIGURE, the broad dotted lines indicate partitions of the image into larger blocks in which a plurality of individual pixels are located.

Such a fingerprint image is produced with a fingerprint sensor when a fingertip is lying on a specially provided contact surface in which the image is registered. When the finger is initially placed on, the entire skin surface that forms the fingerprint is not in contact with this contact surface and the typical pressure is not yet achieved with placing the fingertip on the sensor. When a sequence of fingerprint images is recorded during the placement of the finger on the sensor, the recorded images are generally different from one another; the fingerprint is formed progressively clearer and darker from one image to the next. Due to different mechanical properties, different characteristic features can be observed for the image sequence depending on whether or not a live finger or an imitation of a finger is placed on. The inventive method examines these features and allows the recognition of a live person to be performed on this basis.

Preferred exemplifying embodiments of the method will now be described. An image sequence of a number n of images $B_i$ is recorded at short time intervals, while a specimen (for instance, a fingertip) is placed on the fingerprint sensor. Such a sequence can be recorded by a fingerprint sensor at a sufficiently high image rate (frame rate).

The fingerprint image is rastered into individual pixels. Since the pixels exhibit different brightnesses, each pixel can be assigned a gray value. An images provided with such gray values can be digitized into an entirely black-and-white image by ascertaining which pixels have a gray value above a given threshold value. The pixels are then assigned a binary one, whereas the remaining pixels are assigned a binary zero. The first image of a series typically includes solely binary zeroes if the finger were still removed from the fingerprint sensor at the instant of imaging. The last recorded image looks like the black-and-white structure of the enclosed FIGURE.

Given the binarization of images as described above, the number $n_i$ of non-zero pixels is determined for each of the images. For these numbers, the differences between successive numbers is determined as follows: $d_i = n_i - n_{i-1}$. Advantageously, the number $n_{edge,i}$ of the pixels, which were first set to one in an image $B_i$ (i.e., which were still set to zero in the preceding image $B_{i-1}$) and which also adjoin a pixel that was already set at one in the preceding image (i.e., the number of new margin points) is also determined. In a sequence of forgery images, the new margin points emerge primarily as extensions of the finger grooves. Advantageously, for the last recorded image $B_n$, the total number $n_{ridge}$ is determined from the non-zero pixels that lie in succession along the rendered finger lines or imaginary center lines of the finger lines (one-dimensional), or along corresponding center lines generated with a computer by thinning the finger lines, which are converted by the non-zero pixels into (one-dimensional) curves.

According to a particularly simple and expedient development of the analytical technique, the image sequence is evaluated in such a way that the special images that are determined are those images for which the ratio of the difference $d_i$ of the pixels, which are set at one in two successive images, to one of the numbers $n_{i-1}$ or $n_i$, exceeds a given threshold value. This way, the images are determined in which a clear increase in gray values is detectable compared to the respective previous image. These special images are superimposed by the addition of the zeroes and ones, which have been assigned to the pixels, so that an image with a number of different gray scales emerges. Thus, the gray scale of a pixel in the added image indicates the instance in the imaging sequence in which the relevant pixel achieved sufficient optical density to be set to one.

From the distribution of the gray values in the added image, it can be deduced whether or not the image comes from an image sequence that pertains to the placement of a real live finger. While a uniform distribution of gray values can be observed with a live finger, (i.e., the margins of the blackened region are expressed weakly at the beginning of the time curve and then grown in all directions uniformly), in an image generated by an imitation, a non-uniform gray value distribution is ascertained (i.e., a growth of the gray values has occurred first along the imitated finger lines).

For the purpose of automating the recognition technique, the image region can be partitioned into individual image blocks corresponding to the wide dashed lines of the FIGURE. In each of the blocks, a measure is calculated for the gray value proportion and the gray value distribution. For this purpose, in each block $b_j$, the average value $\mu_j$ of the gray values of the pixels contained in the block, and, as the standard deviation $\sigma_j$, the distribution of the gray values about the average value are calculated. It is then possible to calculate the average value $\mu(\ldots \sigma_j \ldots)$ of the standard deviations for all blocks $b_j$ as a whole and the distribution of the average values of the gray values in the individual blocks as standard deviation $\sigma(\ldots \mu_j \ldots)$. For a selection of the edge lengths of the blocks of approximately one period length of the pattern defined by the grooves and furrows (i.e., having a relatively high average distribution of gray values within the blocks), due to the uniform distribution, only a low distribution of the average values across all blocks occurs for a real finger. For a forgery (imitation of a finger), the opposite behavior can be observed. In the present example, the quotient $\mu(\ldots \sigma_j \ldots)/\sigma(\ldots \mu_j \ldots)$ is a suitable criterion for classifying the images as original images or forgeries.

The described variant is a particularly advantageous exemplifying embodiment. Alternatively, instead of the special images in which a substantial increase of gray values relative to the preceding image is detected, it is also possible to utilize the whole image sequence or some other selection of images from the sequence in order to generate the gray value image by superimposition. In typical original images, the ratio of the above mentioned differences $d_i$ to $n_{edge,i}$ is relatively small (a large number of the pixels that have just been set to one contribute to the increase in blackened regions at the margin), whereas only relatively few margin points darken in a typical forgery. Since the absolute numbers for the sum of $n_{edge,i}$ vary from one image sequence to the next, it is reasonable to perform a normation to the above defined value $n_{ridge}$ and potentially to the overall effective sequence length (number of images with significant increase of optical density).

An aspect of the invention lies in the evaluation of a series of images, which are recorded in succession at very short time intervals as the actual fingerprint emerges, and which are binarized with the aid of a threshold value for the gray value. Counting the number of pixels with variances relative to the preceding image aids filtering out the relevant images from the sequence. The images that are graded as relevant can then be sent to an analysis (for instance, the above described analysis of gray value distribution in the superimposed image) with the aid of which a distinction can be made between an original and a forgery, considering statistically detected features. A particular advantage of the inventive method includes the possibility of automating the method by electronic circuits.

We claim:

1. A method for analyzing electronically generated fingerprint images, which comprises the steps of:
   a) generating a plurality of fingerprint images subdivided into pixels in chronological succession, while a fingerprint is registered by a fingerprint sensor;
   b) determining, for each fingerprint image, a number of pixels containing a gray value exceeding a prescribed gray value;
   c) determining, for each subsequent fingerprint image, a difference between the number of pixels and the corresponding number of pixels of the previous fingerprint image;
   d) determining, for each of the differences, a ratio of the difference and one of the numbers of pixels of the previous fingerprint image and the subsequent fingerprint image;
   e) selecting the fingerprint images for which the ratio exceeds a prescribed limit value;
   f1) binarizing the selected fingerprint images by assigning a binary value one to the pixels containing the gray value exceeding the prescribed gray value and a binary value zero to remaining pixels;
   g1) superimposing the binarized fingerprint images by adding the binary values of the corresponding pixels to generate an image having gray value gradations; and
   h1) deciding by a distribution of the gray values whether the fingerprint is regarded as pertaining to a real live finger.

2. The method according to claim 1, which further comprises the steps of:
   i1) subdividing the image of step g1) into blocks;
   j) calculating, in each block, an average value of the gray values;
   k) calculating, in each block, a standard deviation of the gray values from the average value;
   l) calculating an average value of the standard deviations across all blocks;
   m) calculating a standard deviation of the average values of the gray values;
   n) calculating a quotient of the average value of the standard deviations and the standard deviation of the average values of the gray values; and
   o) deciding by the quotient whether the fingerprint is regarded as pertaining to a real live finger.

3. A method for analyzing electronically generated fingerprint images, which comprises the steps of:
   a) generating a plurality of fingerprint images subdivided into pixels in chronological succession, while a fingerprint is registered by a fingerprint sensor;
   b) determining, for each fingerprint image, a number of pixels containing a gray value exceeding a prescribed gray value;
   c) determining, for each subsequent fingerprint image, a difference between the number of pixels and the corresponding number of pixels of the previous fingerprint image;
   d) determining, for each of the differences, a ratio of the difference and one of the numbers of pixels of the previous fingerprint image and the subsequent fingerprint image;
   e) selecting the fingerprint images for which the ratio exceeds a prescribed limit value;
   f2) determining, for each selected fingerprint image, a number of pixels exceeding the prescribed gray value that did not exceed the prescribed gray value in the preceding fingerprint image and are adjacent to a pixel exceeding the prescribed gray value in the preceding fingerprint image; and
   g2) deciding by the numbers determined in step f2) whether the fingerprint is regarded as pertaining to a real live finger.

4. The method according to claim 3, which further comprises the steps of:
   h2) determining, for each selected fingerprint image, a ratio of the difference determined in step c and one of the numbers of pixels of the appertaining fingerprint images determined in step f2); and
   i2) deciding by the ratio determined in step h2) whether the fingerprint is regarded as pertaining to a real live finger.

5. The method according to claim 4, which further comprises the steps of:
   determining, for a last generated fingerprint image, a special number of pixels exceeding the prescribed gray value and located successively along one of finger lines rendered in the fingerprint image, imaginary center lines of the finger lines and corresponding center lines generated with a computer by thinning the finger lines into curves; and
   dividing the numbers determined in step f2) by the special number.

6. The method according to claim 3, which further comprises the steps of:
   determining, for a last generated fingerprint image, a special number of pixels exceeding the prescribed gray value and located successively along one of finger lines rendered in the fingerprint image, imaginary center lines of the finger lines and corresponding center lines generated with a computer by thinning the finger lines into curves; and
   dividing the numbers determined in step f2) by the special number.

* * * * *